(12) United States Patent
Kan

(10) Patent No.: US 10,121,594 B2
(45) Date of Patent: Nov. 6, 2018

(54) MULTILAYER CERAMIC CAPACITOR

(71) Applicant: TAIYO YUDEN CO., LTD., Taito-ku, Tokyo (JP)

(72) Inventor: Bunkou Kan, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 70 days.

(21) Appl. No.: 15/369,675

(22) Filed: Dec. 5, 2016

(65) Prior Publication Data

US 2017/0162330 A1 Jun. 8, 2017

(30) Foreign Application Priority Data

Dec. 7, 2015 (JP) .................. 2015-238559

(51) Int. Cl.
*H01G 4/30* (2006.01)
*H01G 4/005* (2006.01)
*H01G 4/12* (2006.01)
*H01G 4/232* (2006.01)

(52) U.S. Cl.
CPC ............ *H01G 4/30* (2013.01); *H01G 4/005* (2013.01); *H01G 4/12* (2013.01); *H01G 4/232* (2013.01)

(58) Field of Classification Search
CPC .......... H01G 4/005; H01G 4/012; H01G 4/12; H01G 4/30; H01G 4/232; H01G 4/2325; H01G 4/248
See application file for complete search history.

(56) References Cited

U.S. PATENT DOCUMENTS

| 4,661,884 | A | 4/1987 | Seaman | |
|---|---|---|---|---|
| 6,829,134 | B2 * | 12/2004 | Yamauchi | H01G 4/012 361/303 |
| 8,400,753 | B2 * | 3/2013 | Kim | H01G 4/01 361/303 |
| 8,797,709 | B2 * | 8/2014 | Chung | H01G 4/005 29/25.42 |

(Continued)

FOREIGN PATENT DOCUMENTS

JP 2014160693 A 9/2014

OTHER PUBLICATIONS

The specification with the drawings of co-pending U.S. Appl. No. 15/345,269, filed Nov. 7, 2016, by the same applicant.
(Continued)

*Primary Examiner* — Nguyen Ha
(74) *Attorney, Agent, or Firm* — Law Office of Katsuhiro Arai

(57) ABSTRACT

In an embodiment, a multilayer ceramic capacitor 10 is such that at least lead parts 14a of several first internal electrode layers 14 close to width-direction outer surfaces f3a, f4a of tapered part 11a are curved inward and the area of an exposed part of each curved lead part 14a is greater than the area of an exposed part of a lead part 14a free from curvature, while at least the lead parts 15a of several second internal electrode layers 15 close to width-direction outer surfaces f3a, f4a of the tapered part 11a are curved inward and the area of an exposed part of each curved lead part 15a is greater than the area of an exposed part of a lead part 15a free from curvature. The multilayer ceramic capacitor can mitigate separation of the first and second external electrodes from the capacitor body when mounted on a circuit board.

3 Claims, 4 Drawing Sheets

(56) References Cited

U.S. PATENT DOCUMENTS

| | | |
|---|---|---|
| 9,318,265 B2 | 4/2016 | Kamobe et al. |
| 2005/0094350 A1 | 5/2005 | Kobayashi et al. |
| 2005/0264975 A1* | 12/2005 | Yamazaki ................ H01C 1/02 361/301.1 |
| 2006/0245141 A1* | 11/2006 | Shirasu .................. H01G 4/012 361/303 |
| 2014/0174806 A1* | 6/2014 | Park ........................ H01G 4/12 174/260 |
| 2014/0211368 A1 | 7/2014 | Fujii |
| 2014/0326494 A1 | 11/2014 | Chung et al. |
| 2015/0016014 A1 | 1/2015 | Park et al. |
| 2016/0093441 A1 | 3/2016 | Ahn et al. |
| 2016/0240317 A1 | 8/2016 | Ro et al. |
| 2016/0351335 A1 | 12/2016 | Kato et al. |
| 2017/0162326 A1 | 6/2017 | Kowase |
| 2017/0162327 A1 | 6/2017 | Mizuno |

OTHER PUBLICATIONS

The specification with the drawings of co-pending U.S. Appl. No. 15/362,339, filed Nov. 28, 2016, by the same applicant.

\* cited by examiner

FIG. 1
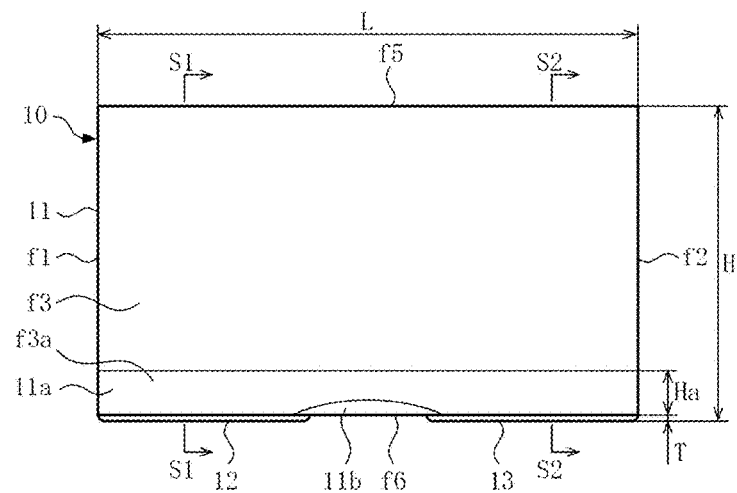
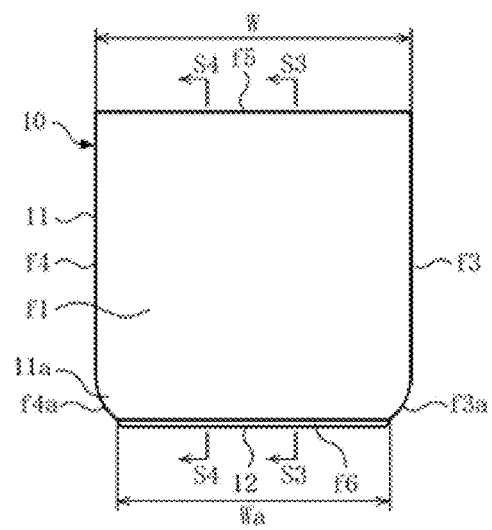
FIG. 2A
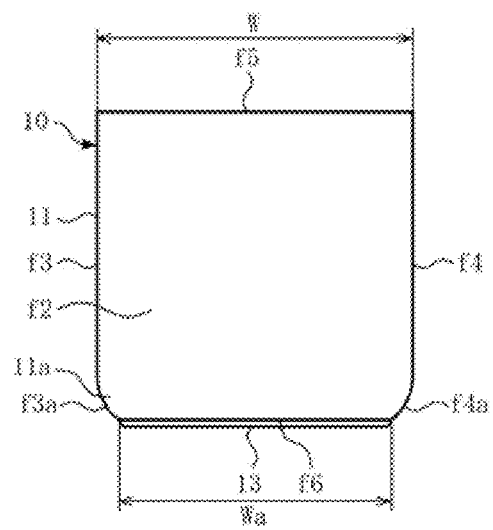
FIG. 2B

MULTILAYER CERAMIC CAPACITOR

BACKGROUND

Field of the Invention

The present invention relates to a multilayer ceramic capacitor constituted by a capacitor body of roughly rectangular solid shape, which has a first external electrode and a second external electrode provided with a space between them on one of the two height-direction surfaces of the capacitor body in the length direction.

Description of the Related Art

As a way to make a multilayer ceramic capacitor smaller while increasing its capacitance at the same time, a structure is known where a first external electrode and a second external electrode are provided with a space between them on one of the two height-direction surfaces of a capacitor body of roughly rectangular solid shape in the length direction (such as Patent Literature 1 described below). As a supplemental note on this structure, the capacitor body has a built-in capacitive part comprising multiple first internal electrode layers and multiple second internal electrode layers stacked alternately in the width direction with dielectric layers in between. Also, the lead part of each first internal electrode layer is exposed on one of the two height-direction surfaces of the capacitor body, with this exposed part connected independently and electrically to the first external electrode; while the lead part of each second internal electrode layer is exposed on one of the two height-direction surfaces of the capacitor body, with this exposed part connected independently and electrically to the second external electrode.

Because its first external electrode and second external electrode are provided on one of the two height-direction surfaces of the capacitor body, this multilayer ceramic capacitor can prevent, to the maximum extent possible, the external dimensions of the capacitor body from being limited by the first external electrode and second external electrode, compared to when the external electrodes have an L-shape, horizontal U-shape, quadrangular cylinder shape with bottom, or the like. This means that, even when the external dimensions of the multilayer ceramic capacitor are small, the capacitor body can be designed with the maximum possible external dimensions, which in turn allows the contour dimensions of the first internal electrode layer and second internal electrode layer to increase, respectively, thereby increasing the facing area of the internal electrode layers and achieving a larger capacitance as a result.

However, the present inventors realized the following problems. That is, a multilayer ceramic capacitor with its first external electrode and second external electrode provided on one of the two height-direction surfaces of the capacitor body generally exhibits weaker separation strength with respect to the first external electrode, and also to the second external electrode, compared to when the external electrodes have an L-shape, horizontal U-shape, quadrangular cylinder shape with bottom, or the like.

To be specific, the surfaces of the first external electrode and second external electrode contacting one of the two height-direction surfaces of the capacitor body each have a planar shape, so when a force acts upon these contact surfaces after the multilayer ceramic capacitor has been mounted on a circuit board, there are concerns that the first external electrode and second external electrode may each displace relative to the capacitor body and end up separating from the capacitor body. Particularly when the multilayer ceramic capacitor is made smaller, an additional factor of having to ensure a space between the first external electrode and second external electrode to prevent short-circuiting adds to the difficulty of allowing the first external electrode and second external electrode to contact one of the two height-direction surfaces of the capacitor body over a wide area, and this makes the aforementioned separation phenomenon more apparent.

Any discussion of problems and solutions involved in the related art (particularly those discussed above) has been included in this disclosure solely for the purposes of providing a context for the present invention, and should not be taken as an admission that any or all of the discussion were known at the time the invention was made.

BACKGROUND ART LITERATURES

[Patent Literature 1] Japanese Patent Laid-open No. 2014-160693

SUMMARY

An object of the present invention is to provide a multilayer ceramic capacitor that, after it has been mounted on a circuit board, can mitigate the phenomenon of the first external electrode and second external electrode separating from the capacitor body without reducing the benefit of capacitance increase.

To achieve the aforementioned object, the multilayer ceramic capacitor pertaining to the present invention is a multilayer ceramic capacitor constituted by a capacitor body of roughly rectangular solid shape, which has a first external electrode and a second external electrode provided with a space between them on one of the two height-direction surfaces of the capacitor body in the length direction, wherein: the capacitor body has a built-in capacitive part comprising multiple first internal electrode layers and multiple second internal electrode layers stacked alternately in the width direction with dielectric layers in between; the lead part of each of the multiple first internal electrode layers is exposed on one of the two height-direction surfaces, with this exposed part connected independently and electrically to the first external electrode; the lead part of each of the multiple second internal electrode layers is exposed on one of the two height-direction surfaces, with this exposed part connected independently and electrically to the second external electrode; at least the lead parts of several first internal electrode layers close to the two surfaces of the capacitor body in the width direction, among the multiple first internal electrode layers, are curved inward and the area of the exposed part of each of the lead parts is greater than the area of the exposed part of a lead part free from curvature; and at least the lead parts of several second internal electrode layers close to the two surfaces of the capacitor body in the width direction, among the multiple second internal electrode layers, are curved inward and the area of the exposed part of each of the lead parts is greater than the area of the exposed part of a lead part free from curvature.

According to the present invention, a multilayer ceramic capacitor can be provided that, after it has been mounted on a circuit board, can mitigate the phenomenon of the first external electrode and second external electrode separating from the capacitor body without reducing the benefit of capacitance increase.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 shows a multilayer ceramic capacitor to which the present invention is applied, as viewed from one side of it in the width direction according to an embodiment.

FIG. 2A shows the multilayer ceramic capacitor in FIG. 1 as viewed from one side of it in the length direction, and FIG. 2B shows the multilayer ceramic capacitor in FIG. 1 as viewed from the other side of it in the length direction according to an embodiment.

DESCRIPTION OF THE SYMBOLS

10—Multilayer ceramic capacitor, 11—Capacitor body, f1—One length-direction surface of the capacitor body, f2—Other length-direction surface of the capacitor body, f3—One width-direction surface of the capacitor body, f4—Other width-direction surface of the capacitor body, f5—One height-direction surface of the capacitor body, f6—Other height-direction surface of the capacitor body, 11a—Tapered part of the capacitor body, f3a, f4a—Width-direction outer surface of the tapered part, 11b—Concaved part of the tapered part, 12—First external electrode, 13—Second external electrode, 14—First internal electrode layer, 14a—Lead part of the first internal electrode layer, 15—Second internal electrode layer, 15a—Lead part of the second internal electrode layer.

DETAILED DESCRIPTION OF EMBODIMENTS

First, the structure of a multilayer ceramic capacitor 10 to which the present invention is applied, is explained using FIGS. 1 through 6. It should be noted that, while in FIG. 4A and FIG. 4B there are 12 each of the first internal electrode layers 14 and second internal electrode layers 15 described below, this is only for the purpose of illustration and does not limit the number of the first internal electrode layers 14 or that of the second internal electrode layers 15. In other words, the number of the first internal electrode layers 14 and that of the second internal electrode layers 15 may be 13 or more, or 11 or less.

Figure 3:
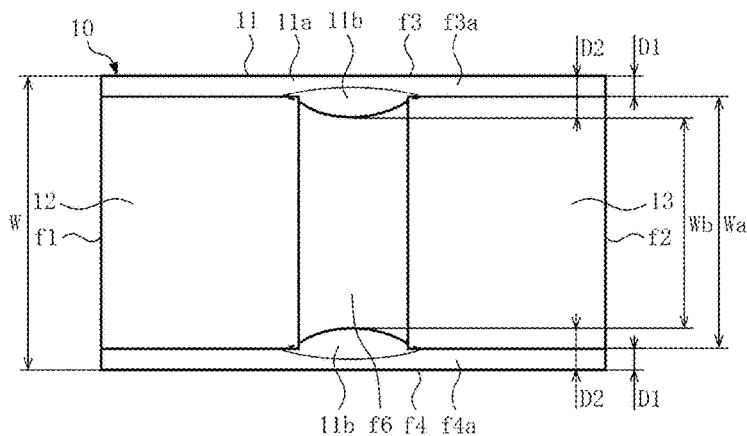
FIG. 3 shows the multilayer ceramic capacitor in FIG. 1 as viewed from the other side of it in the height direction according to an embodiment.

As shown in FIGS. 1 through 3, the multilayer ceramic capacitor 10 has a capacitor body 11 of roughly rectangular solid shape, as well as a first external electrode 12 and a second external electrode 13 provided on one of the two height-direction surfaces (the other height-direction surface f6 as described below) of the capacitor body 11, and its external dimensions are specified by length L, width W (the width of the one height-direction surface f5 as described below) and height H. It should be noted that, while the multilayer ceramic capacitor 10 shown in FIGS. 1 through 3 (and also in FIGS. 4 through 6) is drawn based on a prototype whose length L is 1200 μm, width W is 700 μm, and height H is 700 μm (all are reference dimensions in design that do not include tolerance), the values of length L, width W, and height H are not limited in any way so long as "Length L>Width W=Height H" is satisfied. In addition, while the multilayer ceramic capacitor 10 shown in FIGS. 1 through 3 (and also in FIGS. 4 through 6) has external dimensions that satisfy "Length L>Width W=Height H," its external dimensions may be those that satisfy "Length L>Width W>Height H" or "Length L>Height H>Width W."

As shown in FIGS. 1 through 3, the capacitor body 11 has one length-direction surface f1 and the other length-direction surface f2 that are roughly parallel to each other, one width-direction surface f3 and the other width-direction surface f4 that are roughly parallel to each other, and one height-direction surface f5 and the other height-direction surface f6 that are roughly parallel to each other. Also, at a position adjoining the other height-direction surface f6 of the capacitor body 11, a tapered part 11a is provided whose width gradually decreases toward the other height-direction surface f6 over the entire part in the length direction. Additionally, one width-direction outer surface f3a of the tapered part 11a continues steplessly to the one width-direction surface f3 and is constituted by an outwardly bulging curved surface, while the other width-direction outer surface f4a of the tapered part 11a continues steplessly to the other width-direction surface f4 and is constituted by an outwardly bulging curved surface. Furthermore, the tapered part 11a has, at the length-direction center of the width-direction outer surface f3a and also at the length-direction center of the width-direction outer surface f4a, a concaved part 11b that extends from midway through the width-direction outer surface f3a or f4a in the height direction to the other height-direction surface f6, where each concaved part 11b continues steplessly to the width-direction outer surface f3a or f4a and is constituted by an inwardly concaving curved surface. It should be noted that, although the width-direction outer surfaces f3a, f4a of the tapered part 11a may be planar surfaces, respectively, preferably they are outwardly bulging curved surfaces and, additionally, the concaved part 11b is not absolutely necessary. Also, the symbol Ha in FIG. 1 represents the height-direction dimension of the tapered part 11a with reference to the other height-direction surface f6 of the capacitor body 11. Additionally, the symbol T in FIG. 1 represents the thickness of the first external electrode 12 and that of the second external electrode 13 with reference to the other height-direction surface f6 of the capacitor body 11.

Figure 6:
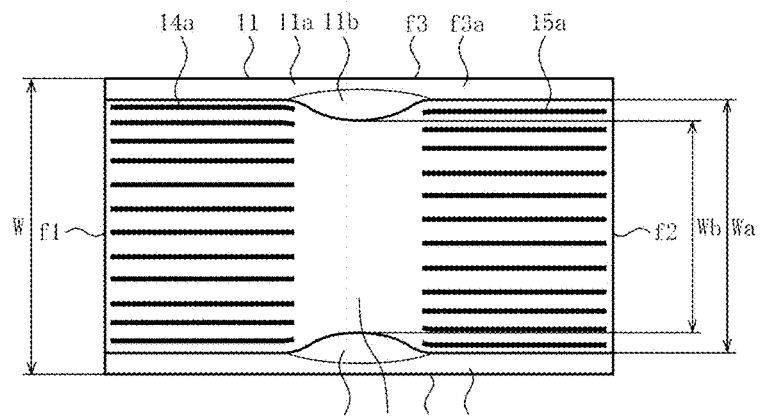
FIG. 6 is the same as FIG. 3, except that the first external electrode and second external electrode have been removed according to an embodiment.

In other words, the other height-direction surface f6 of the capacitor body 11 has an hourglass shape with a constricted center in the length direction because of the existence of the concaved parts 11b on both sides in the width direction, as shown in FIGS. 3 and 6. This means that the part of the other height-direction surface f6 adjoining the one length-direction surface f1, and the part of it adjoining the other length-direction surface f2, have a width Wa which is smaller than the width W of the one height-direction surface f5, and that the minimum width of the length-direction center part of the other height-direction surface f6, or width Wb, is smaller than the width Wa.

Also, the edges along both of the width-direction sides of the length-direction center part of the other height-direction surface f6 continue steplessly, respectively, to the edges along both of the width-direction sides of the two parts of width Wa that are present on both sides in the length direction, and are constituted by inwardly concaving curved lines. It should be noted that the symbol D1 in FIG. 3 represents the width-direction dimension from the one width-direction surface f3 or other width-direction surface f4 of the capacitor body 11 to the part of the other height-direction surface f6 corresponding to the width Wa, or specifically (W−Wa)/2. Also, the symbol D2 in FIG. 3 represents the width-direction dimension from the one width-direction surface f3 or other width-direction surface f4 of the capacitor body 11 to the location of the other height-direction surface f6 corresponding to the width Wb, or specifically (W−Wb)/2.

As shown in FIGS. 4 through 6, the capacitor body 11 has a built-in capacitive part (no symbol) comprising multiple first internal electrode layers 14 and multiple second internal electrode layers 15 stacked alternately in the width direction with a dielectric layer (no symbol) in between. Each first internal electrode layer 14 and each second internal electrode layer 15 have a rectangular shape of roughly equal contour dimensions, and the two length-direction sides, two width-direction sides, and two height-direction sides (except where the lead parts 14a, 15b described below are present) of the capacitive part are covered with margin parts (no symbol) constituted by dielectric material. Also, each first internal electrode layer 14 integrally has a lead part 14a of rectangular shape on its side proximal to the other height-direction surface f6 at a position close to the one length-direction surface f1, where the edge of each lead part 14a is exposed on the other height-direction surface f6 near the one length-direction surface f1 where the width is Wa. Furthermore, each second internal electrode layer 15 integrally has a lead part 15a of rectangular shape whose contour dimensions are roughly equal to that of the lead part 14a, on its side proximal to the other height-direction surface f6 at a position close to the other length-direction surface f2, where the edge of each lead part 15a is exposed on the other height-direction surface f6 near the other length-direction surface f2 where the width is Wa.

Figure 4A:
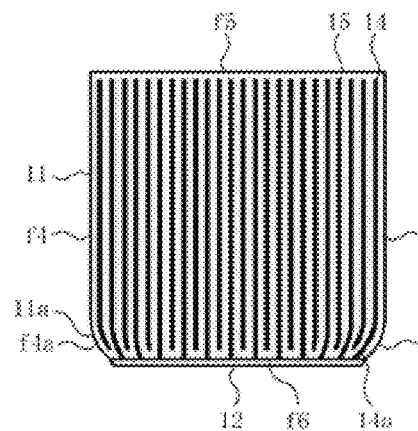
FIG. 4A is a cross sectional view of FIG. 1 along line S1-S1.
Figure 4B:
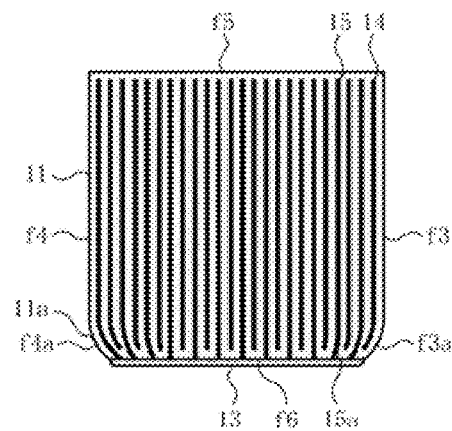
FIG. 4B is a cross sectional view of FIG. 1 along line S2-S2.
Figure 4C:
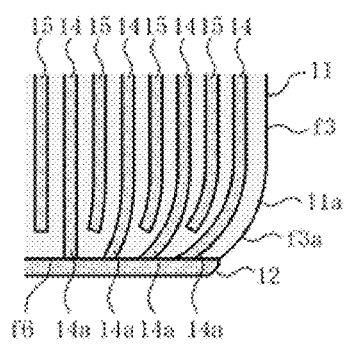
FIG. 4C is a partially enlarged view of FIG. 4A.

As shown in FIGS. 4A through 4C, among the first internal electrode layers 14, several first internal electrode layers 14 close to the one width-direction surface f3 and other width-direction surface f4 of the capacitor body 11, respectively, or specifically to the width-direction outer surfaces f3a, f4a of the tapered part 11a, respectively, are such that their part (including the lead part 14a) close to the other height-direction outer surface f6 is curved inward according to the shape of each width-direction outer surface f3a or f4a. Also, among the second internal electrode layers 15, several second internal electrode layers 15 close to the one width-direction surface f3 and other width-direction surface f4 of the capacitor body 11, respectively, or specifically to the width-direction outer surfaces f3a, f4a of the tapered part 11a, respectively, are such that their part (including the lead part 15a) close to the other height-direction outer surface f6 is curved inward according to the shape of each width-direction outer surface f3a or f4a. More specifically, parts (including the lead parts 14a, 15a, respectively) of the first internal electrode layer 14 and second internal electrode layer 15 closest to the width-direction outer surfaces f3a, f4a, respectively, which are close to the other height-direction surface f6, are curved inward in the same manner as the shapes of the respective width-direction outer surfaces f3a, f4a, while parts (including the lead parts 14a, 15a, respectively) of the first internal electrode layers 14 and second internal electrode layers 15 on the inner side, which are close to the other height-direction surface f6, are curved inward in such a way that their degree of curvature gradually decreases toward the inside. It should be noted that the lead parts 14a, 15a alone can be curved inward by increasing the height-direction dimensions of the respective lead parts 14a, 15a. In this disclosure, the word "several" refers to more than one, two, or three, but not many, e.g., less than a majority.

In addition, as shown in FIG. 6, among the first internal electrode layers 14, several first internal electrode layers 14 close to the one width-direction surface f3 and other width-direction surface f4 of the capacitor body 11, respectively, or specifically to the width-direction outer surfaces f3a, f4a of the tapered part 11a, respectively, are such that their lead part 14a has its part close to each concaved part 11b curved inward according to the shape of the concaved part 11b. Also, among the second internal electrode layers 15, several second internal electrode layers 15 close to the one width-direction surface f3 and other width-direction surface f4 of the capacitor body 11, respectively, or specifically to the width-direction outer surfaces f3a, f4a of the tapered part 11a, respectively, are such that their lead part 15a has its part close to each concaved part 11b curved inward according to the shape of the concaved part 11b. More specifically, parts of the lead parts 14a, 15a closest to the width-direction outer surfaces f3a, f4a, respectively, which are close to the respective concaved parts 11b, are curved in the same manner as the shapes of the concaved parts 11b, while parts of the lead parts 14a, 15a on the inner side, which are close to the respective concaved parts 11b, are curved inward in such a way that their degree of curvature gradually decreases toward the inside.

As shown in FIGS. 1 through 6, the first external electrode 12 is provided at the part of the other height-direction surface f6 of the capacitor body 11 near the one length-direction surface f1 where the width is Wa, in a manner covering the entire surface of this part, while the second external electrode 13 is provided at the part of the other height-direction surface f6 of the capacitor body 11 near the other length-direction surface f2 where the width is Wa, in a manner covering the entire surface of this part. Also, the exposed part of the lead part 14a of each first internal electrode layer 14 is electrically connected to the first external electrode 12, while the exposed part of the lead part 15a of each second internal electrode layer 15 is electrically connected to the second external electrode 13. Although not illustrated, the first external electrode 12 and second external electrode 13 have a two-layer structure constituted by a base film contacting the part of the other height-direction surface f6 of the capacitor body 11 where the width is Wa, and a surface film contacting the outer side of this base film, or a multi-layer structure constituted by a base film, a surface film, and at least one intermediate film in between them.

The aforementioned parts of the capacitor body 11 except for the first internal electrode layers 14 and second internal electrode layers 15 are preferably made of dielectric ceramics of roughly the same composition and roughly the same dielectric constant, and the dielectric layers between the first internal electrode layers 14 and second internal electrode layers 15 have roughly the same thickness. Here, "dielectric ceramics of roughly the same composition and roughly the same dielectric constant" include dielectric ceramics having the same composition and dielectric constant, as well as dielectric ceramics at least one of whose composition and dielectric constant varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For these dielectric ceramics, preferably dielectric ceramics whose primary constituent is barium titanate, strontium titanate, calcium titanate, magnesium titanate, calcium zirconate, calcium titanate zirconate, barium zirconate, titanium oxide, etc., or more preferably dielectric ceramics of $\varepsilon > 1000$ or Class 2 (high dielectric constant type) can be used.

In addition, the aforementioned base film for the first external electrode 12 and second external electrode 13 is constituted by a baked film, for example, and for this baked film, preferably a good conductor whose primary constituent is nickel, copper, palladium, platinum, silver, gold, or alloy thereof, etc., can be used. The surface film is constituted by a plated film, for example, and for this plated film, preferably a good conductor whose primary constituent is copper, tin, palladium, gold, zinc, or alloy thereof, etc., can be used. The intermediate film is constituted by a plated film, for example, and for this plated film, preferably a good conductor whose primary constituent is platinum, palladium, gold, copper, nickel, or alloy thereof, etc., can be used.

Furthermore, the aforementioned first internal electrode layers 14 and second internal electrode layers 15 are preferably each constituted by a good conductor of roughly the same composition and the first internal electrode layers 14 and second internal electrode layers 15 each have roughly the same thickness. Here, "a good conductor of roughly the same composition" includes a good conductor of the same composition as well as a good conductor whose composition varies, within an allowable range, due to its relationship with the sintering level, etc., while "roughly the same thickness" includes the same thickness as well as varying thicknesses within an allowable range or manufacturing tolerance due to the relationship with the compression level, etc., when stacked. For this good conductor, preferably a good conductor whose primary constituent is nickel, copper, palladium, platinum, silver, gold, or alloy thereof, etc., can be used.

Next, the electrical connection of the exposed part of the lead part 14a of each first internal electrode layer 14 and the first external electrode 12, as well as the electrical connection of the exposed part of the lead part 15a of each second internal electrode layer 15 and the second external electrode 13, are explained using FIGS. 4A and 4B.

As is evident from FIGS. 4A and 4B, several first internal electrode layers 14 and second internal electrode layers 15 close to the width-direction outer surfaces f3a, f4a, respectively, are such that parts (including the lead parts 14a, 15a, respectively) of the first internal electrode layer 14 and second internal electrode layer 15 closest to the width-direction outer surfaces f3a, f4a, respectively, which are close to the other height-direction surface f6, are curved inward in the same manner as the shapes of the respective width-direction outer surfaces f3a, f4a, while parts (including the lead parts 14a, 15a, respectively) of the first internal electrode layers 14 and second internal electrode layers 15 on the inner side, which are close to the other height-direction surface f6, are curved inward in such a way that their degree of curvature gradually decreases toward the inside.

To explain this more specifically using FIG. 4C showing an enlarged view of the bottom right area of FIG. 4A, a part (including the lead part 14a) of the first internal electrode layer 14 closest to the width-direction outer surface f3a, which is close to the other height-direction surface f6, is curved inward in the same manner as the shape of the width-direction outer surface f3a. Also, parts (including the lead parts 14a) of the two first internal electrode layers 14 on the inner side, which are close to the other height-direction surface f6, as well as parts of the three second internal electrodes 15 on the inner side, which are close to the other height-direction surface f6, are curved inward in such a way that their degree of curvature gradually decreases toward the inside.

Assume that the radius of curvature of the width-direction outer surface f3a shown in FIG. 4C is 120 μm, for example; in this condition, a part (including the lead part 14a) of the first internal electrode layer 14 closest to the width-direction outer surface f3a, which is close to the other height-direction surface f6, is curved inward at a radius of curvature of roughly 120 μm, while parts (including the lead parts 14a) of two first internal electrode layers 14 being the third and fifth closest to the width-direction outer-surface f3a, which are close to the other height-direction surface f6, as well as parts of three second internal electrodes 15 being the second, fourth and sixth closest, which are close to the other height-direction surface f6, are curved inward in such a way that their degree of curvature gradually decreases toward the inside. It should be noted that, in FIG. 4C, neither a part (including the lead part 14a) of the first internal electrode layer 14 being the seventh closest to the width-direction outer surface f3a, which is close to the other height-direction surface f6, nor a part of the second internal electrode layer 15 being the eighth closest to the width-direction outer surface f3a, which is close to the other height-direction surface f6, is curved.

Figure 4D:
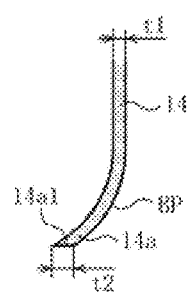
FIG. 4D is a drawing that explains the mode of first internal electrode layers shown in FIG. 4C according to an embodiment.
Figure 5A:
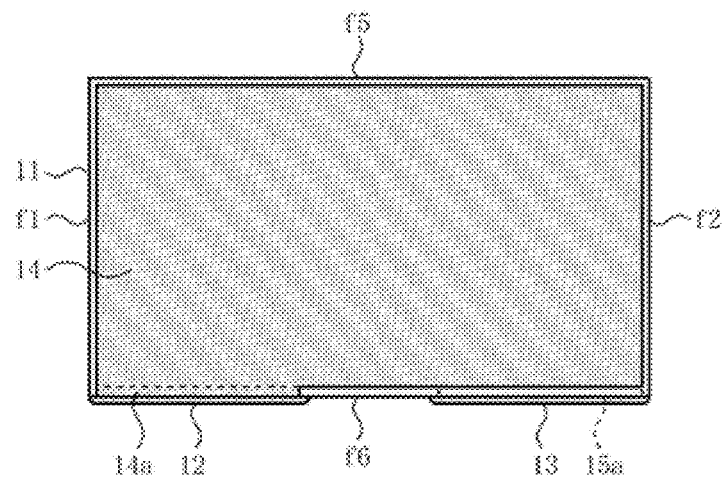
FIG. 5A is a cross sectional view of FIG. 2A along line S3-S3.
Figure 5B:
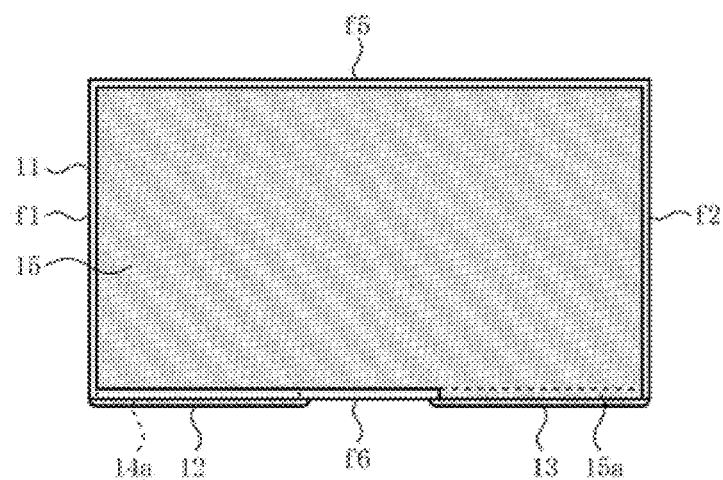
FIG. 5B is a cross sectional view of FIG. 2A along line S4-S4 according to an embodiment.

This means that, as is evident from FIG. 4D showing the first internal electrode layer 14 closest to the width-direction outer surface f3a in FIG. 4C, the three first internal electrode layers 14 shown in FIG. 4C are such that the thickness t2 of the exposed part 14a1 of their lead part 14a revealed on the other height-direction surface f6 is greater than the thickness t1 of their uncurved part when cut in parallel with the other height-direction surface f6. This means that the area of the exposed part 14a1 of the three lead parts 14a having a curved part BP is greater than the area of the exposed part 14a1 of the lead part not having a curved part BP.

For example, assume that, among the three first internal electrode layers 14, the first internal electrode layer 14 closest to the width-direction outer surface f3a is such that its curved part (including the lead part 14a) BP is a curved surface and its radius of curvature is 120 μm and height-direction dimension is 120 μm; in this case, the area of the exposed part 14a1 of this lead part 14a is 1.03 times the area of the exposed part 14a1 of a lead part 14a not having a curved part BP. In addition, the remaining two first internal electrode layers 14 also have a curved part BP whose radius of curvature is greater than that of the curved part BP shown in FIG. 4D, which means that, needless to say, the area of the exposed part 14a1 of their lead part 14a is greater than the area of the exposed part 14a1 of a lead part 14a not having a curved part BP.

The same areal enlargement of the exposed part 14a1 of the lead part 14a as explained using FIGS. 4C and 4D also applies to several first internal electrode layers 14 close to the width-direction outer surface f4a in FIG. 4A, so based on these areal enlargements, the total area of the lead parts 14a of the first internal electrode layers 14 connecting to the first external electrode 12 can be increased and, because of this increase, the total connection strength can be increased. Additionally, the same areal enlargement of the exposed part 14a1 of the lead part 14a as explained using FIGS. 4C and 4D also applies to several second internal electrode layers 15 close to the width-direction outer surface f3a, f4a in FIG. 4B, respectively, so based on these areal enlargements, the total area of the lead parts 15a of the second internal electrode layers 15 connecting to the second external electrode 13 can be increased and, because of this increase, the total connection strength can be increased.

Figure 7A:
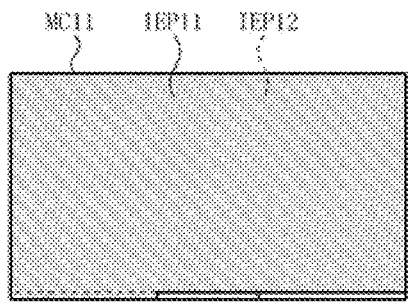
FIGS. 7A and 7B are drawings of cross sections of a laminated chip (FIG. 7A) and an unsintered chip (FIG. 7B) that explain the first manufacturing method example according to an embodiment.
Figure 7B:
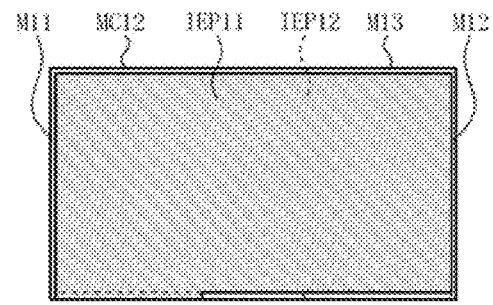
Figure 8:
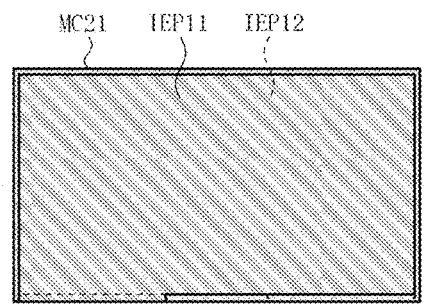
FIG. 8 is a drawing of a cross section of an unsintered chip that explains the second manufacturing method example according to an embodiment.

Next, two manufacturing method examples suitable for the manufacturing of the aforementioned multilayer ceramic capacitor 10, are explained by using FIGS. 7A through 8 as deemed appropriate.

<First Manufacturing Method Example>

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets taken from the first green sheet are stacked and then thermo-compression bonded, and this operation is repeated until a specified number of sheets is reached, to prepare an area corresponding to one margin part in the width direction.

Next, unit sheets (including internal electrode patterns) taken from the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of an unsintered laminated sheet, a concave that will become the tapered part 11a and concaved part 11b shown in FIGS. 1 through 3 is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare laminated chips MC11 whose section view is shown in FIG. 7A. The symbol IEP11 in FIG. 7A indicates an internal electrode pattern corresponding to the first internal electrode layer 14 shown in FIG. 5A, while the symbol IEP12 indicates an internal electrode pattern corresponding to the second internal electrode layer 15 shown in FIG. 5B. It should be noted that the cut laminated chips MC11 do not have the margin parts on both sides in the length direction and the margin part on one side in the height direction. In other words, in this cutting process of unsintered laminated sheet, the unsintered laminated sheet is cut in such a way that the margin parts on both sides in the length direction and the margin part on one side in the height direction are not formed.

Next, the margin parts M11 to M13 shown in section view in FIG. 7B are formed on both sides in the length direction and one side in the height direction of each laminated chip MC11 whose section view is shown in FIG. 7A, using either the method of attaching the sheets prepared beforehand using the ceramic slurry, or the method of dip-coating and then drying the ceramic slurry, to prepare an unsintered chip MC12.

Next, multiple unsintered chips MC12 whose section view is shown in FIG. 7 (B) are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 1 through 3.

Next, the multiple sintered chips are barrel-polished together to have their corners and ridge lines rounded, to prepare the capacitor body 11 shown in FIGS. 1 through 3.

Next, the other height-direction surface f6 of the capacitor body 11 shown in FIGS. 1 through 3 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13, respectively. Next, a surface film covering the base film, or an intermediate film and a surface film, is/are formed by means of plating to prepare the first external electrode 12 and second external electrode 13 as shown in FIGS. 1 through 3.

<Second Manufacturing Method Example>

For the manufacturing, a ceramic slurry containing dielectric ceramic powder, and an electrode paste containing good conductor powder, are prepared. Next, the ceramic slurry is coated on the surface of a carrier film and then dried to prepare a first green sheet, and also the electrode paste is printed on the surface of this first green sheet and then dried to prepare a second green sheet on which internal electrode patterns have been formed.

Next, unit sheets composed of the first green sheet are stacked and then thermo-compression bonded, and this operation is repeated until a specified number of sheets is reached, to prepare an area corresponding to one margin part in the width direction.

Next, unit sheets (including internal electrode patterns) composed of the second green sheet are stacked and then thermo-compression bonded, and this operation is repeated until a specified number of sheets is reached, to prepare an area corresponding to the capacitive part. Next, unit sheets taken from the first green sheet are stacked and then thermo-compression bonded, and this operation is repeated until a specified number of sheets is reached, to prepare an area corresponding to the other margin part in the width direction. Lastly, all of the stacks are thermo-compression bonded for the last time to prepare an unsintered laminated sheet. In this manufacturing process of an unsintered laminated sheet, a concave that will become the tapered part 11a and concaved part 11b shown in FIGS. 1 through 3 is formed at specified positions on the unsintered laminated sheet by, for example, using an elastic sheet for compression-bonding made of synthetic rubber, etc., whose thickness or shape is changed accordingly.

Next, the unsintered laminated sheet is cut in grids to prepare unsintered chips MC21 whose section view is shown in FIG. 8. The symbol IEP11 in FIG. 8 indicates an internal electrode pattern corresponding to the first internal electrode layer 14 shown in FIG. 5A, while the symbol IEP12 indicates an internal electrode pattern corresponding to the second internal electrode layer 15 shown in FIG. 5B. It should be noted that the cut unsintered chips MC21 have the margin parts on both sides in the length direction and the margin part on one side in the height direction. In other words, in this cutting process of unsintered laminated sheet, the unsintered laminated sheet is cut in such a way that the margin parts on both sides in the length direction and the margin part on one side in the height direction are formed.

Next, multiple unsintered chips MC21 whose section view is shown in FIG. 8 are sintered (including binder removal and sintering) together in an ambience and at a temperature profile suitable for the dielectric ceramic powder contained in the ceramic slurry and also for the good conductor powder contained in the electrode paste, to prepare sintered chips each corresponding to the capacitor body 11 shown in FIGS. 1 through 3.

Next, the multiple sintered chips are barrel-polished together to have their corners and ridge lines rounded, to prepare the capacitor body 11 shown in FIGS. 1 through 3.

Next, the other height-direction surface f6 of the capacitor body 11 shown in FIGS. 1 through 3 is dip-coated in an electrode paste (this electrode paste may be the same as the aforementioned electrode paste, or it may be another electrode paste containing a different type of good conductor powder) and the paste is dried, and then baked, to form a base film for the first external electrode 12 and for the second external electrode 13. Next, a surface film covering the base film, or an intermediate film and a surface film, is/are formed by means of plating to prepare the first external electrode 12 and the second external electrode 13 as shown in FIGS. 1 through 3.

Next, the effects achieved by the multilayer ceramic capacitor 10 are explained.

(1) With the multilayer ceramic capacitor 10, the fact that its first external electrode 12 and second external electrode 13 are provided on the other height-direction surface f6 of the capacitor body 11, prevents, to the maximum extent possible, the external dimensions of the capacitor body 11 from being limited by the first external electrode 12 and second external electrode 13, compared to when the external electrodes have an L-shape, horizontal U-shape, quadrangular cylinder shape with bottom, or the like. This means that, even when the external dimensions of the multilayer ceramic capacitor 10 are small, the capacitor body 11 can be designed with the maximum possible external dimensions, which in turn allows the contour dimensions of the first internal electrode layer 14 and second internal electrode layer 15 to increase, respectively, thereby increasing the facing area of the internal electrode layers and achieving a larger capacitance as a result.

(2) With the multilayer ceramic capacitor 10, among the multiple first internal electrode layers 14, several first internal electrode layers 14 close to the one width-direction surface f3 and other width-direction surface f4 of the capacitor body 11, respectively, or specifically to the width-direction outer surfaces f3a, f4a of the tapered part 11a, respectively, are such that at least their lead part 14a is curved inward and the area of the exposed part of each such lead part 14a is greater than the area of the exposed part of a lead part 14a free from curvature. Also, among the multiple second internal electrode layers 15, several second internal electrode layers 15 close to the one width-direction surface f3 and other width-direction surface f4 of the capacitor body 11, respectively, or specifically to the width-direction outer surfaces f3a, f4a of the tapered part 11a, respectively, are such that at least their lead part 15a is curved inward and the area of the exposed part of each such lead part 15a is greater than the area of the exposed part of a lead part 15a free from curvature. This means that, based on the aforementioned areal enlargements, the total area of the lead parts 14a of the first internal electrode layers 14 connecting to the first external electrode 12 can be increased and, because of this increase, the total connection strength can be increased, while the total area of the lead parts 15a of the second internal electrode layers 15 connecting to the second external electrode 13 can also be increased and, because of this increase, the total connection strength can be increased, and consequently the phenomenon of the first external electrode 12 and second external electrode 13 separating from the capacitor body 11 can be mitigated.

(3) With the multilayer ceramic capacitor 10, a tapered part 11a whose width decreases gradually toward the other height-direction surface f6 over the entire length of the part, is provided at a position adjoining the other height-direction surface f6 of the capacitor body 11, and at least the lead parts 14a of the aforementioned several first internal electrode layers 14 and at least the lead parts 15a of the aforementioned several second internal electrode layers 15 are curved inward according to the shapes of the respective width-direction outer surfaces f3a, f4a of the tapered part 11a. This means that, by providing the tapered part 11a at the position adjoining the other height-direction surface f6 of the capacitor body 11, the several first internal electrode layers 14 whose lead part 14a at least is curved inward, and the several second internal electrode layers 15 whose lead part 15a at least is curved inward, can be obtained without fail.

(4) With the multilayer ceramic capacitor 10, the width-direction outer surfaces f3a, f4a of the tapered part 11a each continue steplessly to the one width-direction surface f3 or other width-direction surface f4 of the capacitor body 11 and are each constituted by an outwardly bulging curved surface. This means that, by constituting the width-direction outer surfaces f3a, f4a of the tapered part 11a as outwardly bulging curved surfaces, the curved parts of at least the lead parts 14a of the aforementioned several first internal electrode layers 14 can be shaped like a curved surface and the curved parts of at least the lead parts 15a of the aforementioned several second internal electrode layers 15 can be shaped like a curved surface, and consequently the area of the exposed part obtained by inward curvature can be increased compared to when the curved part is obtained by dull-angle folding. In addition, concerns for cracking, chipping, etc., resulting from concentration of stress on any step that may exist between the width-direction outer surface f3a or f4a of the tapered part 11a and the one width-direction surface f3 or other width-direction surface f4 of the capacitor body 11, can be eliminated. Also, drop in the strength of the tapered part 11a of the capacitor body 11 can be prevented to the maximum extent possible, compared to when the width-direction outer surfaces f3a, f4a are each constituted by an inwardly concaving curved surface.

Next, the verified results of the aforementioned effects, especially the verified results of separation strength, are explained.

For the verification, 100 evaluation multilayer ceramic capacitors corresponding to the multilayer ceramic capacitor 10, and 100 comparison multilayer ceramic capacitors not corresponding to the multilayer ceramic capacitor 10, were manufactured.

<Specifications of Evaluation Multilayer Ceramic Capacitor>

The evaluation multilayer ceramic capacitors were prepared according to the <First Manufacturing Method Example> described above, and their specifications (all values are reference dimensions in design that do not include tolerance) are as follows:

The multilayer ceramic capacitor is 1200 μm long, 700 μm wide, and 700 μm high. (The length is indicated by L in FIG. 1, width is indicated by W in FIGS. 2A and 2B, and height is indicated by H in FIG. 1.)

The capacitor body is 1200 μm long, 700 μm wide, and 685 μm high. (The capacitor body is indicated by 11 in FIG. 1, and its length is indicated by L in FIG. 1, width is indicated by W in FIGS. 2A and 2B, and height is indicated by H-T in FIG. 1.)

The primary constituent of the capacitor body, except for the first internal electrode layers and second internal electrode layers, is barium titanate. (The first internal electrode layers are indicated by 14 in FIGS. 4A through 4C and second internal electrode layers are indicated by 15 in FIG. 4A through 4C.)

The first internal electrode layer and second internal electrode layer, except for the lead parts, have a length-direction dimension of 1170 μm and height-direction dimension of 650 μm, and the respective lead parts have a length-direction dimension of 435 μm and height-direction dimension of 20 μm. (The lead parts are indicated by 14a and 15a in FIGS. 5A and 5B.)

The primary constituent of the first internal electrode layer and second internal electrode layer is nickel, each layer is 0.5 μm thick, and the number of layers is 335 each.

The dielectric layer present between the first internal electrode layer and second internal electrode layer is 0.5 μm thick.

The height-direction dimension of the tapered part of the capacitor body is 120 μm, and the radius of curvature of the width-direction outer surface of the tapered part is 120 μm. (The tapered part is indicated by 11a in FIG. 1, height-direction dimension is indicated by Ha in FIG. 1, and width-direction outer surface is indicated by f3a or f4a in FIGS. 2A and 2B.)

The other height-direction surface of the capacitor body is 600 μm wide on the wider side and 500 μm wide on the narrower side. (The other height-direction surface is indicated by f6 in FIG. 3, its width on the wider side is indicated by Wa in FIG. 3 and width on the narrower side is indicated by Wb in FIG. 3, and D1 in FIG. 3 is 50 μm and D2 in FIG. 3 is 100 μm.)

The margin parts on both sides of the capacitor body in the length direction are 15 μm thick, margin parts on both sides in the width direction are 15 μm thick, margin part on one side in the height direction is 15 μm thick, and margin part on the other side in the height direction is 20 μm thick. (The one side in the height direction corresponds to the top side in FIGS. 5A and 5B, and the other side in the height direction corresponds to the bottom side in FIGS. 5A and 5B.)

The first external electrode and second external electrode have a length-direction dimension of 470 μm and width-direction dimension of 600 μm. (The first external electrode is indicated by 12 in FIG. 1 and second external electrode is indicated by 13 in FIG. 1.)

The first external electrode and second external electrode have a space of 260 μm between them in the length direction.

The first external electrode and second external electrode have a three-layer structure and are each 15 μm thick, where the base film is primarily constituted by copper and 10 μm thick, the intermediate film is primarily constituted by nickel and 2 μm thick, and the surface film is primarily constituted by tin and 3 μm thick. (The thickness of the first external electrode and that of the second external electrode are each indicated by T in FIG. 1.)

<Specifications of Comparison Multilayer Ceramic Capacitor>

The comparison multilayer ceramic capacitors were prepared according to the <First Manufacturing Method Example> described above, just like the evaluation multilayer ceramic capacitors were, and they differ from the evaluation multilayer ceramic capacitors in that their capacitor body has no tapered part (the capacitor body is indicated by 11 in FIG. 1 and tapered part is indicated by 11a in FIG. 1) and in that parts of the first internal electrode layer and second internal electrode layer, respectively, which are close to the other height-direction surface, have no curved part (the first internal electrode layer is indicated by 14 in FIGS. 4A through 4C, second internal electrode layer is indicated by 15 in FIGS. 4A through 4C, and curved part is indicated by BP in FIG. 4D). It should be noted that, since the comparison multilayer ceramic capacitors do not have the tapered part the evaluation multilayer ceramic capacitors have, their first external electrode and second external electrode have a width-direction dimension of 700 μm (the first external electrode is indicated by 12 in FIG. 1 and second external electrode is indicated by 13 in FIG. 1).

For the verification of effects, the 100 evaluation multilayer ceramic capacitors and 100 comparison multilayer ceramic capacitors were tested by pressing a piece of adhesive tape (CT-24 manufactured by Nichiban) with an adhesive strength of 10 N per 25 mm, onto the first external electrode and second external electrode of each multilayer ceramic capacitor and then peeling it off. As a result of the test, none of the 100 evaluation multilayer ceramic capacitors had both their first external electrode and second external electrode separated, while three of the 100 comparison multilayer ceramic capacitors had both their first external electrode and second external electrode separated. This confirmed that the evaluation multilayer ceramic capacitors had better separation strength with respect to the first external electrode and second external electrode compared to the comparison multilayer ceramic capacitors.

The following is a supplemental note on the radius of curvature of the curved part BP of the first internal electrode layer 14, and the radius of curvature of the curved part BP of the second internal electrode layer 15, as explained using FIG. 4D, by considering the specifications of the evaluation multilayer ceramic capacitor, etc.

With the evaluation multilayer ceramic capacitors, the maximum radius of curvature of the curved part BP of the first internal electrode layer 14 (refer to the bottom right area of FIG. 4A), and the maximum radius of curvature of the curved part BP of the first internal electrode layer 14 (refer to the bottom left area of FIG. 4B), were both roughly 120

μm. As described earlier, the radii of curvature of the curved parts BP of the first internal electrode layer 14 and second internal electrode layer 15, respectively, increase gradually toward the inside, which means that the degree of the "increase in the total connection area, and increase in the total connection strength based on this increase" as mentioned above, vary depending on the maximum radii of curvature of the first internal electrode layer 14 and second internal electrode layer 15, respectively. Based on the specifications of the prototype manufactured when the evaluation multilayer ceramic capacitors were manufactured, not much could be expected for the "increase in the total connection area, and increase in the total connection strength based on this increase" when the maximum radii of curvature of the curved parts BP of the first internal electrode layer 14 and second internal electrode layer 15, respectively, were less than 75 μm, and this means that, in practicality, the "increase in the total connection area, and increase in the total connection strength based on this increase" can be achieved without fail when the maximum radii of curvature of the curved parts BP of the first internal electrode layer 14 and second internal electrode layer 15, respectively, are 75 μm or more.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2015-238559, filed Dec. 7, 2015, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. A multilayer ceramic capacitor constituted by a capacitor body of roughly rectangular solid shape constituted by two height-direction surfaces, two width-direction surfaces, and two length-direction surfaces, which capacitor body has a first external electrode and a second external electrode provided with a space between them on one of two height-direction surfaces of the capacitor body, with a space between the first and second electrodes in a length direction, wherein:
   the capacitor body has a built-in capacitive part comprising multiple first internal electrode layers and multiple second internal electrode layers stacked alternately in a width direction with dielectric layers in between;
   a lead part of each of the multiple first internal electrode layers is exposed on the one of the two height-direction surfaces, with said exposed part connected independently and electrically to the first external electrode;
   a lead part of each of the multiple second internal electrode layers is exposed on the one of the two height-direction surfaces, with said exposed part connected independently and electrically to the second external electrode;
   at least the lead parts of several first internal electrode layers close to the respective two width-direction surfaces of the capacitor body, among the multiple first internal electrode layers, are curved inward and an area of the exposed part of each of the curved lead parts is greater than an area of the exposed part of the lead part of each first internal electrode layer free from curvature; and
   at least the lead parts of several second internal electrode layers close to the respective two width-direction surfaces of the capacitor body, among the multiple second internal electrode layers, are curved inward and an area of the exposed part of each of the curved lead parts is greater than an area of the exposed part of the lead part of each second internal electrode layer free from curvature.

2. A multilayer ceramic capacitor according to claim 1, wherein:
   each of the width-direction surfaces of the capacitor body has, at a position adjoining the one of the two height-direction surfaces, a tapered part whose width decreases gradually toward the one of the two height-direction surfaces over an entire length of the part; and
   at least the lead parts of several first internal electrode layers close to the respective two width-direction surfaces of the capacitor body, and at least the lead parts of several second internal electrode layers close to the respective two width-direction surfaces of the capacitor body, are each curved inward along a shape of each of width-direction outer surfaces of the tapered parts.

3. A multilayer ceramic capacitor according to claim 2, wherein the width-direction outer surfaces of the tapered parts each continue steplessly to each of the respective two width-direction surfaces of the capacitor body, and are each constituted by an outwardly bulging curved surface.

* * * * *